(12) United States Patent
Kanamori et al.

(10) Patent No.: US 8,334,836 B2
(45) Date of Patent: Dec. 18, 2012

(54) DRIVING METHOD FOR DRIVING ELECTROPHORETIC DISPLAY APPARATUS, ELECTROPHORETIC DISPLAY APPARATUS, AND ELECTRONIC DEVICE

(75) Inventors: Hiroaki Kanamori, Suwa (JP); Munenori Sawada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 973 days.

(21) Appl. No.: 12/389,603

(22) Filed: Feb. 20, 2009

(65) Prior Publication Data

US 2009/0237351 A1 Sep. 24, 2009

(30) Foreign Application Priority Data

Mar. 19, 2008 (JP) .................................. 2008-071309

(51) Int. Cl.
*G09G 3/34* (2006.01)

(52) U.S. Cl. ....................................................... 345/107

(58) Field of Classification Search .................... 345/107
See application file for complete search history.

(56) References Cited

U.S. PATENT DOCUMENTS

2006/0187185 A1* 8/2006 Yoshinaga et al. ............ 345/107

2008/0007816 A1* 1/2008 Maeda .......................... 359/296

FOREIGN PATENT DOCUMENTS

| JP | 2002-149115 | 5/2002 |
| JP | 2007-206267 | 8/2007 |

* cited by examiner

*Primary Examiner* — Quan-Zhen Wang
*Assistant Examiner* — Tony Davis
(74) *Attorney, Agent, or Firm* — AdvantEdge Law Group, LLC

(57) ABSTRACT

A driving method for driving an electrophoretic display apparatus, which has a display section including a plurality of pixels each having a pixel electrode and a common electrode opposing each other and an electrophoretic element interposed therebetween which includes electrophoretic particles, includes erasing a first image displayed on the display section, during a process of rewriting the first image into a second image. The driving method includes displaying the second image on the display section, during the process of rewriting the first image into the second image, wherein the corrected image data is image data obtained by correcting image data associated with the second image so as to reduce an area displaying the one gradation and expand an area displaying the other gradation in the second image.

4 Claims, 11 Drawing Sheets

SECOND IMAGE

FIRST CORRECTED IMAGE

DRIVING METHOD FOR DRIVING ELECTROPHORETIC DISPLAY APPARATUS, ELECTROPHORETIC DISPLAY APPARATUS, AND ELECTRONIC DEVICE

BACKGROUND

1. Technical Field

The present invention relates to a technical field of a driving method for driving an electrophoretic display apparatus, an electrophoretic display apparatus, and an electronic device.

2. Related Art

A typical electrophoretic display apparatus includes a pair of substrates, one having pixel electrodes thereon and the other having common electrodes thereon, and interposing therebetween electrophoretic elements each of which encloses a dispersion medium including electrophoretic particles, and further, movement of the electrophoretic particles caused by supplying a voltage difference between the pixel electrodes and the common electrodes allows displaying of an image. In association with rewriting of a displayed image, for example, a technology in which, in order to lower a driving voltage and reduce errors in rewriting and so on, the displayed image is erased once by displaying a gradation the same as that of the displayed image over the whole of a display area, and then, a new image to be displayed subsequent to the rewriting is written into the display area, has been proposed (refer to, for example, JP-A-2002-149115). Furthermore, a technology in which, in order to reduce unevenness of display due to continuous writing of the same gradation, an image is partially rewritten by supplying a voltage difference to a portion of a display area, has been proposed (refer to, for example, JP-A-2007-206267).

However, in the case described in the foregoing technology, where a new image is written into a display area subsequent to erasing the whole of the display area including a displayed image, a voltage difference is likely to occur even in an unintended area due to the spread of an electric field occurring in an area to which a voltage difference is supplied. That is, a gradation is likely to be changed even in a potion of the display area where the gradation is not intended to be changed. Therefore, the foregoing technology has a problem in which an image intended to be displayed is likely not to be properly displayed.

SUMMARY

Accordingly, it is desirable to provide a driving method for driving an electrophoretic display apparatus, an electrophoretic display apparatus and an electronic device capable of preventing a rewritten image from being displayed in a deformed condition, as well as reducing degradation of image quality and power consumption.

A driving method for driving an electrophoretic display according to a first aspect of the invention is a driving method for driving an electrophoretic display apparatus which has a display section including a plurality of pixels each having a pixel electrode and a common electrode opposing each other and an electrophoretic element interposed therebetween which includes electrophoretic particles. The driving method includes erasing a first image displayed on the display section, during a process of rewriting the first image into a second image, by supplying the common electrode with a common voltage, supplying the pixel electrode of a pixel among the plurality of pixels which is displaying one gradation out of a first gradation and a second gradation different from the first gradation with a voltage corresponding to the other gradation different from the one gradation, supplying the pixel electrode of a pixel among the plurality of pixels which is displaying the other gradation with a voltage of the same level as the common voltage, and displaying the second image on the display section, during the process of rewriting the first image into the second image, by supplying the common electrode with the common voltage, supplying the pixel electrode of a pixel among the plurality of pixels which is targeted for displaying the one gradation in accordance with corrected image data with a voltage corresponding to the one gradation, supplying the pixel electrode of a pixel among the plurality of pixels which is targeted for displaying the other gradation in accordance with corrected image data with a voltage of the same level as the common voltage, wherein the corrected image data is image data obtained by correcting image data associated with the second image so as to reduce an area displaying the one gradation and expand an area displaying the other gradation in the second image.

In accordance with the driving method for driving an electrophoretic display according to the first aspect of the invention, by supplying a voltage difference, in accordance with image data to be written, between the pixel electrode and the common electrode in each of the plurality of pixels included in the display section of the electrophoretic display apparatus, movement of the electrophoretic particles included in the electrophoretic elements interposed between the pixel electrode and the common electrode is caused, and thereby, an image is displayed on the display section.

The plurality of pixel electrodes are arranged, for example, in a matrix, each intersection point of which corresponds to one of intersection points of data lines and scanning lines which are configured so as to intersect one another. Each pixel having the pixel electrode is configured so as to be capable of operating in an active-matrix driving mode by providing the pixel with a transistor which operates as a pixel switching element. On the other hand, the common electrode is located so as to be opposite the plurality of the pixel electrodes, for example, in a solid condition. The electrophoretic element is, for example, a microcapsule, and includes therein electrophoretic particles composed of, for example, a plurality of white color particles being negatively charged and also a plurality of black color particles being positively charged. When an electrophoretic display apparatus is driven according to the first aspect of the driving method for driving an electrophoretic display apparatus of the invention, out of two groups of the plurality of white color particles being negatively charged and the plurality of black color particles being positively charged, one group is moved towards the pixel electrode and the other group is moved to the common electrode (i.e., an occurrence of electrophoretic movement of the particles), in accordance with a voltage difference supplied between the pixel electrode and the common electrode, and thereby, an image is displayed on the common electrode side.

According to the first aspect of the invention, particularly, when a displayed first image is rewritten into a second image, during the erasing, firstly, a common voltage is supplied to the common electrode. On the other hand, in association with the pixel electrodes, to the pixel electrodes in the pixels among the plurality of pixels, displaying one gradation out of a first gradation and a second gradation that is different from the first gradation, a voltage corresponding to the other gradation that is different from a voltage corresponding to the one gradation is supplied. That is, either of a group of pixels displaying a first gradation or a group of pixels displaying a second gradation is selected, and to the pixel electrodes in the selected group of pixels, a voltage corresponding to the other gradation displayed by the unselected group of pixels, which is different from the one gradation displayed by the selected group of pixels, is supplied. Further specifically, for example, assuming that the first gradation and the second gradation correspond to a white color and a black color, respectively, a voltage corresponding to the black color is supplied to the pixels displaying the white color, so that the color displayed by the pixels displaying the white color is rewritten into the black color. Alternatively, a voltage corresponding to the white color is supplied to the pixels displaying the black color, so that the color displayed by the pixels displaying the black color is rewritten into the white color. Further, a voltage of the same level as the common voltage is supplied to the pixel electrodes in the pixels among the plurality of pixels, displaying the other gradation. Therefore, a voltage difference does not occur between the pixel electrode and the common electrode in each of the pixels displaying the other gradation. Thus, the gradation of the pixels displaying the other gradation is not changed.

As a result of the driving in such a manner as described above, the display section is partially rewritten (i.e., only a portion of the display section displaying the one gradation is rewritten), so that a solid image having the other gradation is displayed on the whole of the display section. That is, the first image which has been displayed on the display section is erased by displaying a solid image having the first gradation or the second gradation on the whole of the display section. In this manner, by erasing the first image prior to displaying the second image, it is possible to prevent errors in rewriting and so on due to, for example, a timing discrepancy in supplying the voltage and/or a leak current through the transistor.

During the displaying subsequent to the erasing, the common voltage is supplied to the common electrode just like performed during the erasing. On the other hand, in association with the pixel electrode, the voltage corresponding to the one gradation is supplied, in accordance with corrected image data, to the pixel electrodes in the pixels among the plurality of pixels, targeted for displaying the one gradation. Thus, in association with the pixels targeted for displaying the one gradation, the gradation displayed by the pixels is changed from the other gradation to the one gradation. Further, the voltage of the same level as the common voltage is supplied, in accordance with corrected image data, to the pixel electrodes in the pixels among the plurality of pixels, targeted for displaying the other gradation. Thus, in association with the pixels targeted for displaying the other gradation, the gradation displayed by the pixels is not changed, so that the other gradation continues to be displayed.

As a result of the driving in such a manner as described above, the display section is partially rewritten (i.e. only a portion of the display section targeted for displaying the one gradation is rewritten), and then, the second image is displayed. By performing such a partial rewriting as performed during the erasing and the displaying, as described above, it is possible to reduce power consumption, and degradation of image quality due to, for example, continuous writing of a same gradation.

Moreover, the forgoing corrected image data is image data obtained by correcting the image data associated with the second image so as to reduce an area displaying the one gradation and expand an area displaying the other one gradation. This correction is made so as to prevent an image from being displayed in a deformed condition resulting from supplying a voltage difference to a portion of pixels among the plurality of pixels (i.e. resulting from the partial rewriting of image). Specifically, in the case where a voltage difference is supplied to a portion of the pixels among the plurality of pixels, an electric field occurring due to the voltage difference makes an affect even on the voltage difference non-supplied pixels located near the voltage difference supplied pixels (e.g., the voltage difference non-supplied pixels and so on adjacent to the voltage difference supplied pixels). Thus, a voltage difference occurs in the voltage difference non-supplied pixels, and it leads to driving the electrophoretic elements in the voltage difference non-supplied pixels. Accordingly, the displayed image results in having an area expanded from the area displaying the gradation generated by the supplied voltage difference. That is, if the foregoing correction according to the first aspect of the invention is not made in the case where a voltage difference is supplied to only the pixels targeted for displaying the one gradation, it results in displaying an image having an expanded area displaying the one gradation and a reduced area displaying the other gradation.

Thus, according to the first aspect of the invention, particularly, during the displaying, as described above, the process is performed on the basis of the corrected image data obtained by correcting the image data associated with the second image so that, in the second image, the area displaying the one gradation can be reduced and the area displaying the other gradation can be expanded. That is, the second image is displayed by using the image data corrected so that respective areas, which are likely to be expanded and reduced due to the spread of the electronic field, can be reduced and expanded. Accordingly, it is possible to display the second image having no deformation, or having little deformation significantly reduced to the extent not to be visually recognized.

For example, in the case where any of the first gradation and the second gradation can be selected as the one gradation under operation (i.e., in the case where the gradation of the solid image displayed during the erasing can be changed under operation), the foregoing deformation of the image due to the spread of the electronic field is likely to be particularly visually recognized since one image having the same content may be displayed as two kinds of images having mutually different shapes. Thus, in this case, the foregoing advantage according to the first aspect of the invention is more particularly brought out.

Additionally, when the image data is corrected into the corrected image data, it is typically performed that the second image is displayed without correction in two cases, one case being that the first gradation is selected as the one gradation (which is denoted by case A), the other case being that the second gradation is selected as the one gradation (which is denoted by case B), and a difference between a ratio of the dimensions of the area displaying the first gradation to the whole dimensions of the displayed second image in the case A and a ratio of the dimensions of the area displaying the second gradation to the whole dimensions of the displayed second image in the case B is calculated, so that, on the basis of the resultant difference, the area displaying the first gradation in the case A is reduced and the area displaying the second gradation in the case B is expanded. Typically, such a correction is made in advance for each image to be displayed by the electrophoretic display apparatus, and pieces of corrected image data are stored, for example, in a memory device and so on of the electrophoretic display apparatus.

As described above, in accordance with the driving method for driving an electrophoretic display apparatus according to the first aspect of the invention, it is possible to reduce degradation of image quality and power consumption, as well as to prevent a rewritten image from being displayed in a deformed condition.

In accordance with an embodiment of the driving method for driving an electrophoretic display apparatus according to the first aspect of the invention, the displaying includes selecting one of first corrected image data and second corrected image data as the corrected data, wherein the first corrected image data is image data obtained by correcting the image data associated with the second image so as to reduce an area displaying the first gradation and expand an area displaying the second gradation in the second image, and the second corrected image data is image data obtained by correcting the image data associated with the second image so as to reduce an area displaying the second gradation and expand an area displaying the first gradation in the second image, and during the selecting, in the case where the one gradation in the erasing is the first gradation, the first corrected image data is selected as the corrected image data, and in the case where the one gradation in the erasing is the second gradation, the second corrected image data is selected as the corrected image data.

According to the embodiment, during the selecting included in the displaying, either of the first corrected image data, which is obtained by correcting the image data associated with the second image so as to reduce an area displaying the first gradation and expand an area displaying the second gradation in the second image, or the second corrected image data, which is obtained by correcting the image data associated with the second image so as to reduce an area displaying the second gradation and expand an area displaying the first gradation in the second image, is selected as the corrected image data. That is, the first corrected image data and the second corrected image data are stored in advance, for example, in a memory device and so on, and either of the two kinds of corrected image data is selected as the corrected image data when necessary during the displaying.

During the selecting, in the case where the one gradation in the erasing is the first gradation, the first corrected image data is selected as the corrected image data, and in the case where the one gradation in the erasing is the second gradation, the second corrected image data is selected as the corrected image data. According to the embodiment of the driving method, as described above, since the corrected image data is selected in accordance with the one gradation in the erasing, it is possible to surely prevent deformation of the second image occurring during the displaying.

An electrophoretic display apparatus according to a third aspect of the invention includes the driving method for driving an electrophoretic display apparatus, including various embodiments thereof, according to the first aspect of the invention.

Since the electrophoretic display apparatus according to the third aspect of the invention includes the driving method for an electrophoretic display apparatus according to the first aspect of the invention, just like in the case of the driving method according to the first aspect of the invention, it is possible for the electrophoretic display apparatus to reduce degradation of image quality and power consumption, as well as to prevent a rewritten image from being displayed in a deformed condition.

An electronic device according to a fourth aspect of the invention includes the foregoing electrophoretic display apparatus, including various embodiments thereof, according to the third aspect of the invention.

Since the electronic device according to the fourth aspect of the invention includes the electrophoretic display apparatus according to the third aspect of the invention, it is possible to realize various kinds of the electronic devices capable of reducing degradation of image quality and power consumption and preventing a rewritten image from being displayed in a deformed condition, such as watches, electronic paper, electronic notebooks, mobile phones and mobile audio devices.

Operations and other advantages of the aspects of the invention will be made apparent from exemplary embodiments described below.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments of the invention will be hereinafter described with reference to the accompanying drawings.

Firstly, an overall configuration of an electrophoretic display apparatus according to an embodiment of the invention will be described with reference to FIGS. 1 and 2.

Figure 1:
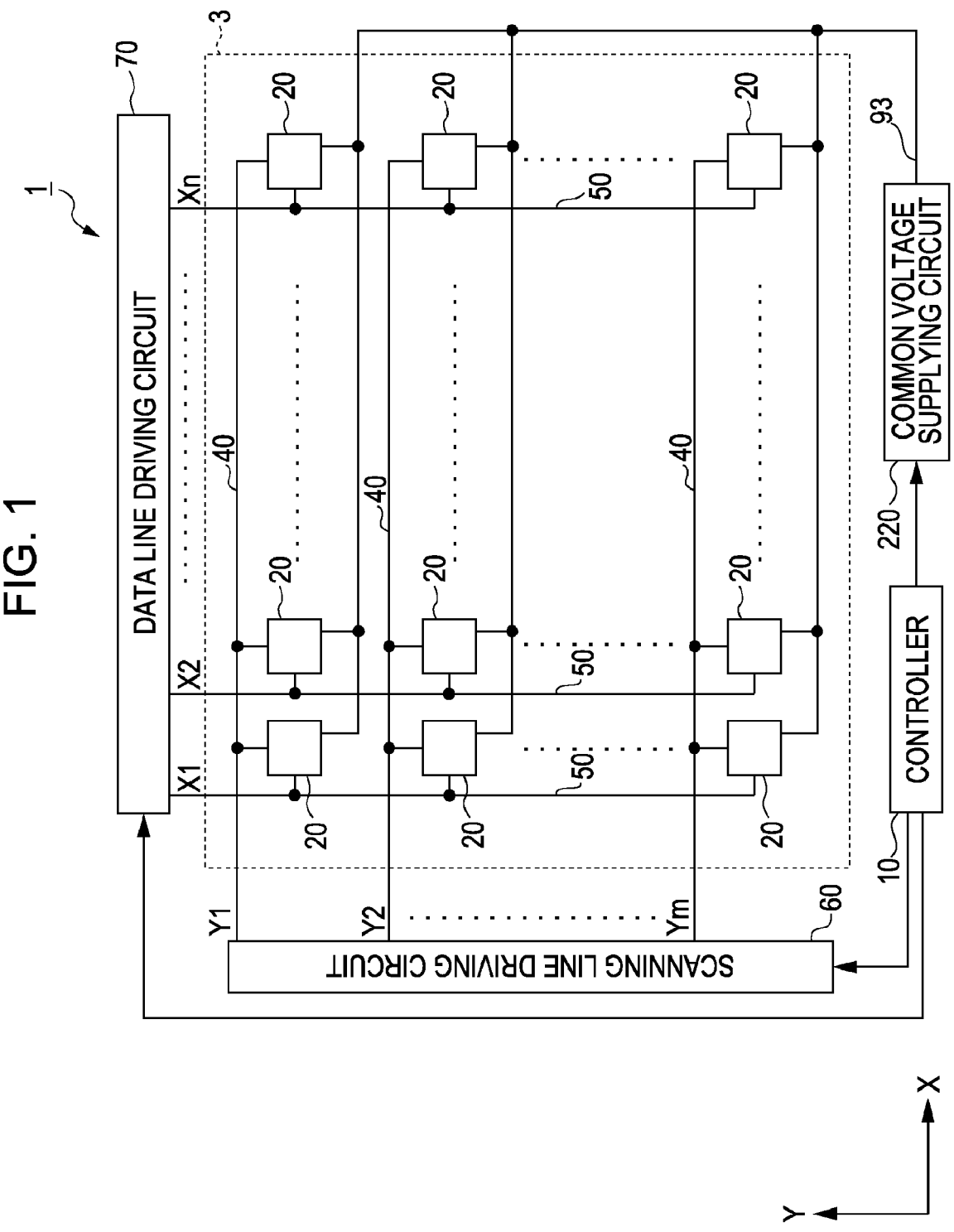
FIG. 1 is a schematic diagram depicting an overall configuration of an electrophoretic display apparatus according to an embodiment of the invention.

FIG. 1 is a schematic diagram depicting an overall configuration of an electrophoretic display apparatus according to an embodiment of the invention.

In FIG. 1, the electrophoretic display apparatus 1 according to the embodiment of the invention includes a display section 3, a controller 10, a scanning line driving circuit 60, a data line driving circuit 70 and a common voltage supplying circuit 220.

In the display section 3, pixels 20 are arranged in a matrix (i.e. two-dimensionally in plan view) of m-rows and n-columns. Further, in the display section 3, m scanning lines 40 (i.e., scanning lines Y1 to Ym) and n data lines 50 (i.e., data lines X1 to Xn) are configured so as to intersect one another. Specifically, m scanning lines 40 extend in the direction of rows (i.e., in the direction of an X-axis), and n data lines 50 extend in the direction of columns (i.e., in the direction of a Y-axis). Each of the pixels 20 is located so as to correspond to one of intersection points of m scanning lines 40 and n data lines 50.

The controller 10 performs control of operations of the scanning line driving circuit 60, the data line driving circuit 70 and the common voltage supplying circuit 220. The controller 10 supplies each of these circuits with, for example, timing signals such as a clock signal and a starting pulse.

The scanning line driving circuit 60 sequentially supplies each of the scanning lines Y1 to Ym with a scanning signal in a pulse form on the basis of the timing signals supplied from the controller 10.

The data line driving circuit 60 supplies each of the data lines X1 to Xn with an image signal on the basis of the timing signals supplied from the controller 10. The image signal employs a binary voltage of a high level voltage VH (e.g., 15 V) and a low level voltage VL (e.g., 0 V). In addition, in the embodiment of the invention, an image signal of the low level voltage VL is supplied to pixels 20 targeted for displaying a white color, whereas an image signal of the high level voltage VH is supplied to pixels 20 targeted for displaying a black color.

The common voltage supplying circuit 220 supplies a common voltage line 93 with a common voltage Vcom. In addition, the common voltage Vcom may be a constant voltage, or may vary according to, for example, a gradation to be written.

In the embodiment of the invention, as described below, a voltage of the same level as the common voltage Vcom is supplied to the pixels 20. This may be realized by causing the level of the common voltage Vcom being output from the common voltage supplying circuit 220 to be same as the high level voltage VH or the low level voltage VL, or causing the data line driving circuit 70 to supply another signal of the same level as the common voltage Vcom in addition to the signal of the high level voltage VH or the low level voltage VL.

Additionally, various kinds of signals are inputted/outputted to/from the controller 10, the scanning line driving circuit 60, the data line driving circuit 70 and the common voltage supplying circuit 220, however, description of signals unassociated with this embodiment of the invention is omitted here.

Figure 2:
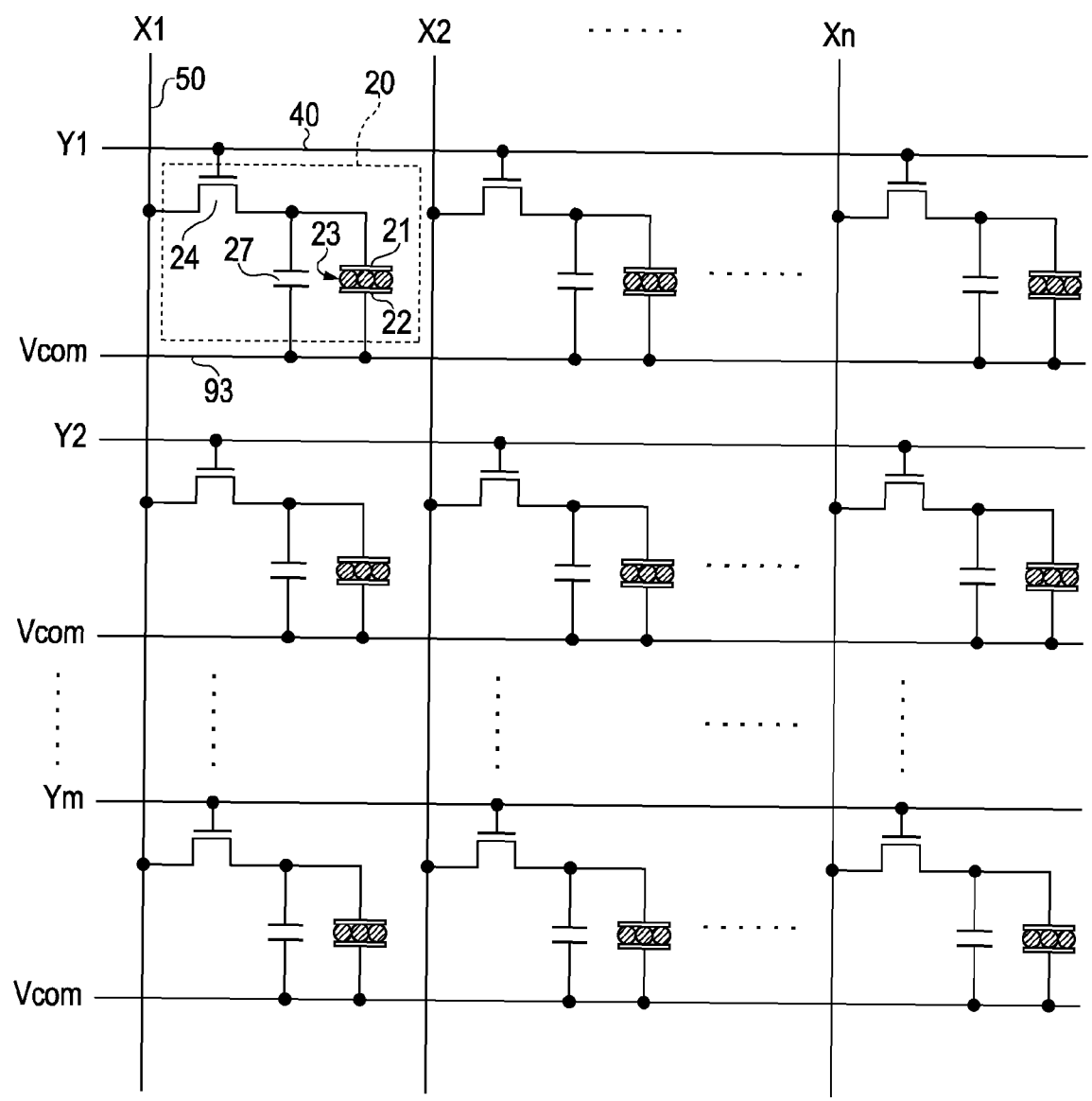
FIG. 2 is an equivalent circuit diagram depicting an electrical configuration of a pixel according to an embodiment of the invention.

FIG. 2 is an equivalent circuit diagram depicting an electrical configuration of a pixel.

In FIG. 2, each of the pixels 20 includes a pixel switching transistor 24, a pixel electrode 21, a common electrode 22, an electrophoretic element 23 and a holding capacitor 27.

The pixel switching transistor 24 is composed of, for example, an N-channel transistor. The pixel switching transistor 24 has a gate node electrically connected with one of the scanning lines 40, a source node electrically connected with one of the data lines 50 and a drain node electrically connected with the pixel electrode 21 and the holding capacitor 27. The pixel switching transistor 24 outputs an image signal, which is supplied from the data line driving circuit 70 (refer to FIG. 1) via one of the data lines 50, to the pixel electrode 21 and the holding capacitor 27 at a timing synchronized with the scanning signal in a pulse form, which is supplied from the scanning line driving circuit 60 (refer to FIG. 1) via one of the scanning lines 40.

An image signal is supplied to the pixel electrode 21 from the data line driving circuit 70 via one of the data lines 50 and the pixel switching transistor 24. The pixel electrode 21 is located so as to be opposite the common electrode 22 via the electrophoretic element 23. The common electrode 22 is electrically connected with the common voltage line 93 to which the common voltage Vcom is supplied.

The electrophoretic element 23 is composed of a plurality of microcapsules each including electrophoretic particles.

The holding capacitor 27 is composed of a pair of electrodes, which are located so as to be opposite each other via an electric film, one being electrically connected with the pixel electrode 21 and the pixel switching transistor 24, the other one being electrically connected with the common voltage line 93. The image signal can be retained for a certain period of time by the holding capacitor 27.

Next, a specific configuration of a display section of the electrophoretic display apparatus according to the embodiment of the invention will be hereinafter described with reference to FIGS. 3 and 4.

Figure 3:
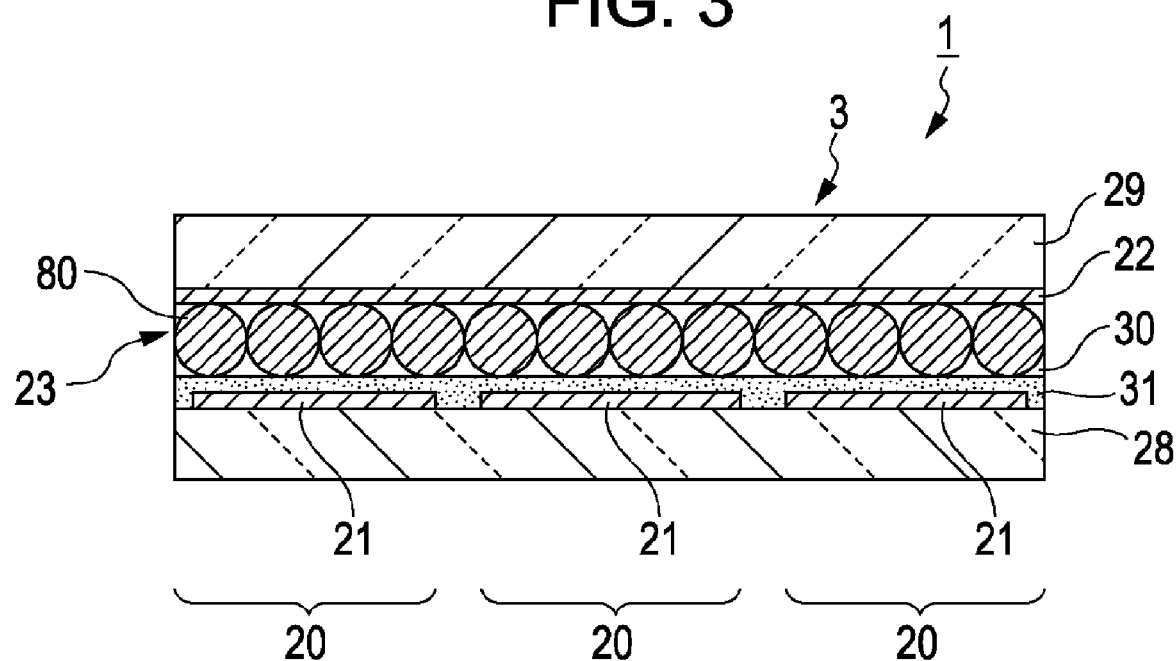
FIG. 3 is a partial cross-section diagram of a display section of an electrophoretic display apparatus according to an embodiment of the invention.

FIG. 3 is a partial cross-section diagram of the display section of the electrophoretic display apparatus according to the embodiment of the invention.

In FIG. 3, the display section 3 is configured so as to hold the electrophoretic element 23 between an element substrate 28 and an opposite substrate 29. In addition, the following description of the embodiment of the invention will be made on the assumption that the image is displayed on the opposite substrate 29 side.

The element substrate 28 is a substrate made of, for example, glass, plastic or the like. On the element substrate 28, a laminated layer structure, although omitted in FIG. 3, integrating therein the pixel switching transistor 24, the holding capacitor 27, the scanning lines 40, the data lines 50, the common voltage line 93 and so on, which were described above with reference to FIG. 2, is formed. On an upper layer of this laminated layer structure, a plurality of pixel electrodes 21 are formed in a matrix.

The opposite substrate 29 is a transparent substrate made of, for example, glass, plastic or the like. On the surface of the opposite substrate 29 opposing the element substrate 28, the common electrode 22 is formed in a solid condition so as to be opposite the plurality of pixel electrodes 21. The common electrode 22 is made of a transparent conductive material, such as a magnesium silver (MgAg), an indium tin oxide (ITO) or an indium zinc oxide (IZO).

The electrophoretic element 23 is composed of a plurality of microcapsules 80 each including electrophoretic particles, and is interposed between the element substrate 28 and the opposite substrate 29 by using an adhesion layer 31 and a binder 30 composed of, for example, resins and so on. In addition, the electrophoretic display apparatus 1 according to the embodiment of the invention has a structure in which, during a manufacturing process, an electrophoretic sheet composed of the opposite substrate 29 and the electrophoretic element 23, which is fixed on the opposite substrate 29 by the binder 30 in advance, and the surface of the element substrate 28, on which the pixel electrodes 21 and so on are formed during a different manufacturing process, are bonded by the adhesion layer 31.

The microcapsules 80 are interposed between the pixel electrodes 21 and the common electrode 22, and one or more microcapsules 80 are allocated within one pixel 20 (in other words, for one pixel electrode 21).

Figure 4:
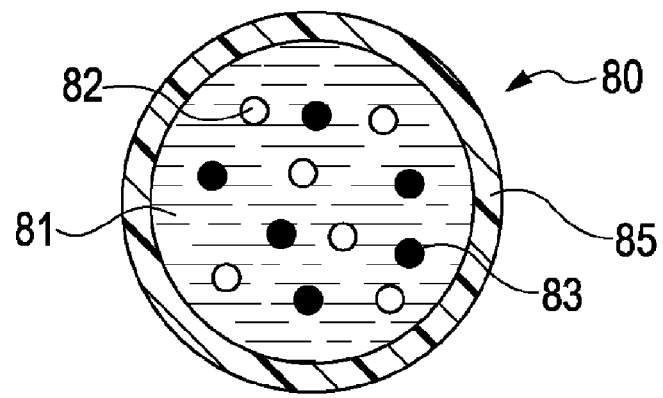
FIG. 4 is a schematic diagram depicting the structure of a microcapsule.

FIG. 4 is a schematic diagram depicting the structure of a microcapsule. In addition, in FIG. 4, a cross-section of the microcapsule is schematically depicted.

In FIG. 4, the microcapsule 80 includes a dispersion medium 81, a plurality of white color particles 82 and a plurality of black color particles 83 encapsulated in a film 85. The microcapsule 80 is formed, for example, in a globular shape having a particle diameter of about 50 um. Additionally, the white color particles 82 and the black color particles 83 are one example of the electrophoretic particles according to the embodiment of the invention.

The film 85 functions as an outer shell of the microcapsule 80, and is made of a polymeric resin having translucency, which is an arylate resin such as polymethylmethacrylate and polyethylmethacrylate, a urea resin, a gum arabic, gelatin, or the like.

The dispersion medium 81 is a medium which disperses the white color particles 82 and the black color particles 83 inside the microcapsule 80 (in other words, inside the film 85). As the dispersion medium 81, one of the following liquids can be used singly or in a mixture with any other of the following liquids: water; an alcohol solvent such as methanol, ethanol, isopropanol, butanol, octanol and methyl cellusolve; an ester solvent such as ethyl acetate and butyl acetate; a ketone group such as acetone, methyl ethyl ketone and methyl isobutyl ketone; an aliphatic hydrocarbon such as pentane, hexane and octane; an alicyclic hydrocarbon such as cyclohexane, methyl cyclohexane; benzene; toluene; an aromatic hydrocarbon such as a benzene series having a long-chain alkyl base such as xylene, hexyl benzene, heptyl benzene, octyl benzene, nonyl benzene, decyl benzene, undecylic benzene, dodecyl benzene, tridecyl benzene and tetradecyl benzene; a halogenated hydrocarbon such as methylene chloride, chloroform, carbon tetrachloride and 1,2 dichloroethane; a carboxylate salt; and other types of oils. In addition, the dispersion medium 81 may be combined with an interfacial active agent.

Each of the white color particles 82 is a particle (a polymer molecule or a colloid) made of a white color pigment, such as titanium dioxide, a Chinese white (a zinc oxide) or an antimony trioxide, and further, is, for example, negatively charged.

Each of the black color particles 82 is a particle (a polymer molecule or a colloid) made of a black color pigment, such as an aniline black or a carbon black, and further, is, for example, positively charged.

For this reason, the white color particles 82 and the black color particles 83 can move inside the dispersion medium 81 due to the electric field resulting from supplying of a voltage difference between the pixel electrode 21 and the common electrode 22.

To these pigments, when necessary, a charging control material composed of particles such as electrolytes, interfacial active agents, metal soaps, resins, gum, oil, varnish and compounds, dispersants such as titanium coupling agents, aluminum coupling agents and silane coupling agents, lubricant agents, stabilization agents and so on, can be added.

In FIGS. 3 and 4, in the case where a voltage difference is supplied between the pixel electrode 21 and the common electrode 22 so as to cause the voltage level of the common electrode 22 to be relatively higher than that of the pixel electrode 21, the black color particles 83 being positively charged are attracted by Coulomb force towards the pixel electrode 21 inside the microcapsule 80, whereas the white color particles 82 being negatively charged are attracted by Coulomb force towards the common electrode 22 inside the microcapsule 80. As a result of this, the white color particles 82 gather at the display side (i.e. at the common electrode 22 side) in the microcapsule 80, so that the color of the white color particles 82 (i.e. a white color) is displayed on the surface of the display section 3. In contrast in the case where a voltage difference is supplied between the pixel electrode 21 and the common electrode 22 so as to cause the voltage level of the pixel electrode 21 to be relatively higher than that of the common electrode 22, the white color particles 82 being negatively charged are attracted by Coulomb force towards the common electrode 22, whereas the black color particles 83 being positively charged are attracted by Coulomb force towards the pixel electrode 21. As a result of this, the black color particles 83 gather at the display side (i.e., at the side of the common electrode 22) in the microcapsule 80, so that the color of the black color particles 83 (i.e. a black color) is displayed on the surface of the display section 3.

Additionally, replacement of the pigments used as the white color particles 82 and the black color particles 83 by pigments having a red color, a green color, a blue color or the like enables display of the red color, the green color, the blue color or the like on the surface of the display section 3.

Next, a driving method for driving an electrophoretic display apparatus according to the embodiment of the invention will be hereinafter described with reference to FIGS. 5 to 13.

Figure 5:
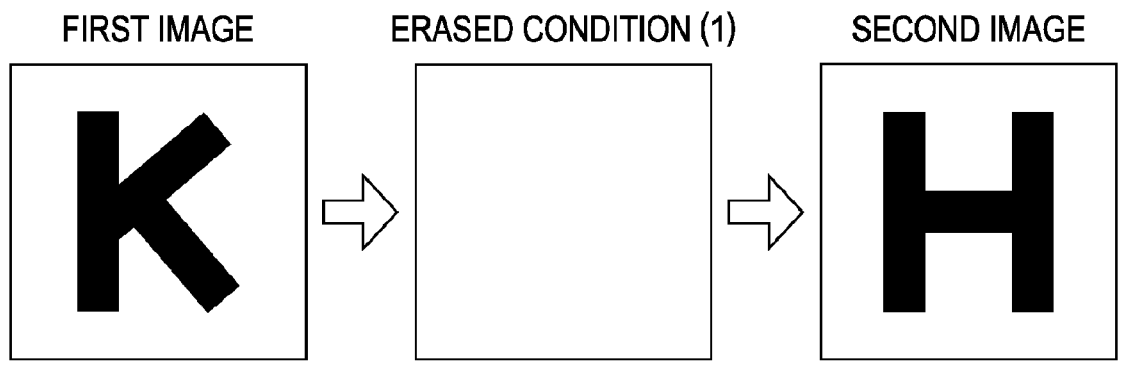
FIG. 5 is a first process drawing depicting in a step-by-step manner an image rewriting process in a driving method according to an embodiment of the invention.
Figure 6:
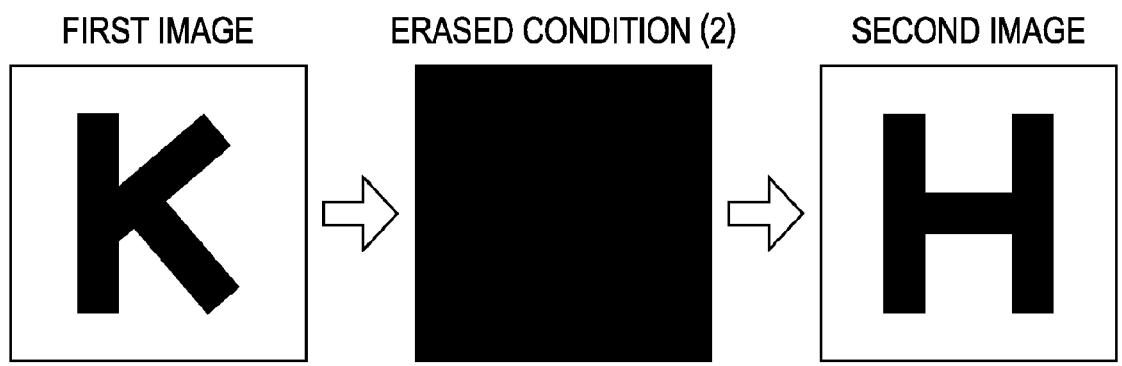
FIG. 6 is a second process drawing depicting in a step-by-step manner an image rewriting process in a driving method according to an embodiment of the invention.

FIGS. 5 and 6 are process drawings depicting in a step-by-step manner rewriting processes, respectively, in the driving method according to the embodiment of the invention.

In FIGS. 5 and 6, in the driving method for the electrophoretic display apparatus according to the embodiment of the invention, as shown in FIG. 5, a first image displayed on the display section 3 shown on the left hand side of the figure (i.e., an image having a black color alphabet letter "K" on a white background) is rewritten into a second image shown on the right hand side of the figure (i.e., an image having a black color alphabet letter "H" on a white background) via an erased condition (1) in which a solid white color image is displayed. Alternatively, as shown in FIG. 6, a first image displayed on the display section 3 is rewritten into a second image via an erased condition (2) in which a solid black color image is displayed. In addition, it is matter of a design whether the rewriting is performed via the erased condition (1) or the erased condition (2), and it can be freely decided. Therefore, for example, the rewriting via the erased condition (1) and the rewriting via the erased condition (2) may be alternatively performed, or either of the rewriting via the erased condition (1) or the rewriting via the erased condition (2) may be constantly performed.

Figure 7:
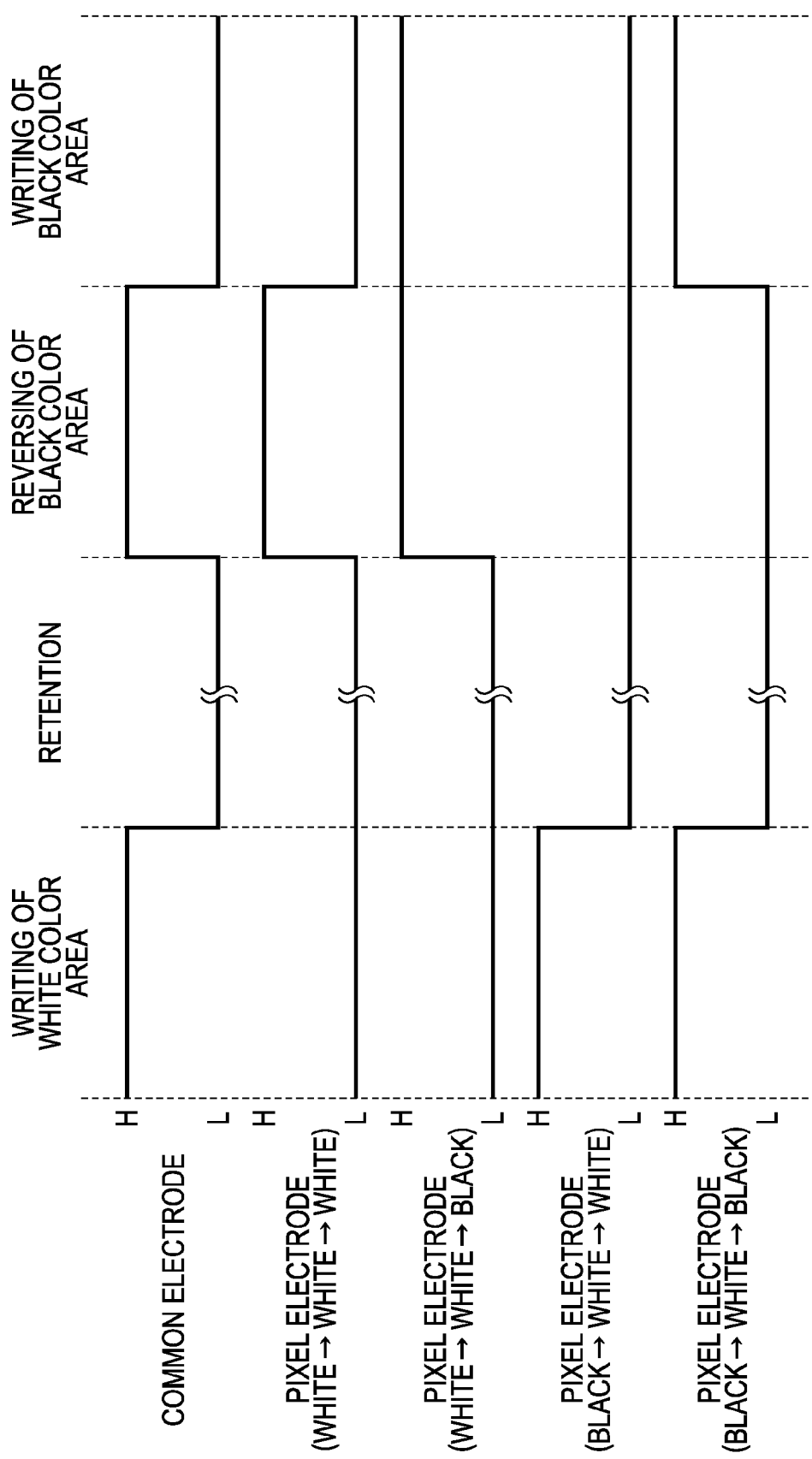
FIG. 7 is a first timing chart depicting each level of voltages supplied to a common electrode and a pixel electrode for each process in a driving method according to an embodiment of the invention.

FIG. 7 is a first timing chart depicting each level of voltages supplied to a common electrode and a pixel electrode for each process in a driving method according to an embodiment of the invention. Additionally, the following description will be made by way of example for the case shown FIG. 5, where the first image is rewritten into the second image via a solid white color image (i.e., via the erased condition (1)).

In FIGS. 5 and 7, for example, in the case where a solid black color image is displayed on the display section 3, the first image is displayed by causing only the pixels 20 targeted for displaying a white color in the first image (i.e., the pixels 20 in the surrounding area of the alphabet letter "K") to rewrite their own display color into a white color. More specifically, as shown in FIG. 7, the high level voltage VH is supplied to the common electrode 22 as the common voltage Vcom by the common voltage supplying circuit 220 (refer to FIG. 1). Further, the low level voltage VL is supplied to the pixel electrodes 21 of the pixels 20 which are allowed to rewrite their own display color from a black color to a white color (i.e., the pixels 20 targeted for displaying a white color in the first image) by the data line driving circuit 70. As a result of this, in each of the pixels 20 which are allowed to rewrite their own presentation color from the black color to the white color, a voltage difference occurs between the common electrode 22 and the pixel electrode 21, so that the electrophoretic element 80 of the pixel 20 is driven so as to display the white color. On the other hand, the high level voltage VH is supplied to the pixels 20 targeted for retaining a black color (i.e., the pixels 20 targeted for displaying a black color in the first image), so that a voltage difference does not occur between the common electrode 22 and the pixel electrode 21. Thus, the pixels 20 are not rewritten and continue to display the black color. In addition, actually, if corrected image data, which will be described below, is not used in the rewriting of the first image, deformation of an image occurs; however, this description is omitted here.

The first image is retained for a certain period of time, and then, is rewritten into the second image. In addition, during the retention period of time, the low level voltage VL is supplied to both the common electrode 22 and the pixel electrode 21. Thus, a voltage difference does not occur between the common electrode 22 and the pixel electrode 21.

When the rewriting of the image is performed, firstly, only the pixels 20 displaying a black color (i.e., the pixels 20 in the area forming the alphabet letter "K") are rewritten so as to display a white color. As a result of this, a solid white color image is displayed, as shown in the erased condition (1) of FIG. 5. More specifically, as shown in FIG. 7, the high level voltage VH is supplied to the common electrode 22 as the common voltage Vcom by the common voltage supplying circuit 220. Further, the low level voltage VL is supplied to the pixel electrodes 21 of the pixels 20 which are allowed to rewrite their own display color from a black color to a white color (i.e., the pixels 20, displaying a black color in the first image, being targeted for displaying a white color in the erased condition (1)) by the data line driving circuit 70. As a result of this, in the pixels 20 which are allowed to rewrite their own display color from the black color to the white color, a voltage difference occurs between the common electrode 22 and the pixel electrode 21, so that the electrophoretic elements 80 of the pixels 20 are driven so as to display the white color. On the other hand, the high level voltage VH is supplied to the pixel electrodes 21 of the pixels 20 targeted for retaining a white color (i.e., the pixels 20 displaying a white color in the first image, being targeted for continuously displaying the white color even in the erased condition (1)), so that a voltage difference does not occur between the common electrode 22 and the pixel electrode 21. Thus, the pixels 20 continue to display the white color.

Once the display section 3 is under the erased condition (1), only the pixels 20 targeted for displaying a black color in the second image (i.e., the pixels 20 in the area forming the alphabet letter "H") are rewritten so as to display the black color. More specifically, as shown in FIG. 7, the low level voltage VL is supplied to the common electrode 22 as the common voltage Vcom by the common voltage supplying circuit 220. Further, the high level voltage VH is supplied to the pixel electrodes 21 of the pixels 20 which are allowed to rewrite their own display color from a white color to a black color (i.e., the pixels 20 targeted for displaying a black color in the second image) by the data line driving circuit 70. As a result of this, in the pixels 20 which are allowed to rewrite their display color from the white color to the black color, a voltage difference occurs between the common electrode 22 and the pixel electrode 21, so that the electrophoretic elements 80 of the pixels 20 are driven so as to display the black color. On the other hand, the low level voltage VL is supplied to the pixel electrodes 21 of the pixels 20 targeted for retaining a white color (i.e., the pixels 20 targeted for displaying a white color in the second image), so that a voltage difference does not occur between the common electrode 22 and the pixel electrode 21. Thus, the pixels 20 continue to display the white color.

Figure 8:
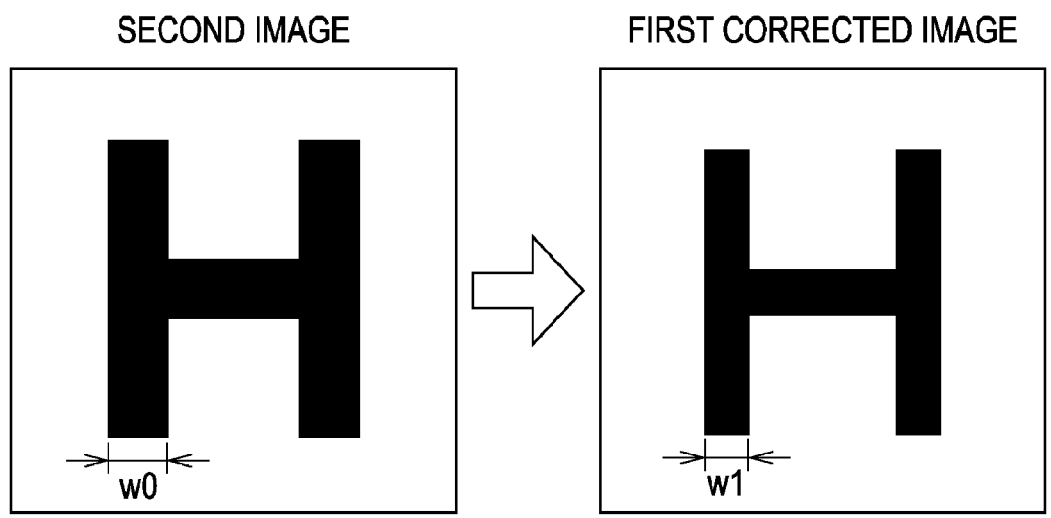
FIG. 8 is a plan view depicting a second image and a first corrected image obtained by correcting the second image.

FIG. 8 is a plan view depicting a second image and a first corrected image obtained by correcting the second image.

In FIG. 8, image data to be written into the display section 3 under the foregoing erased condition (1) is first corrected image data for generating a first corrected image, which is obtained by correcting image data associated with the second image. The first corrected image is an image obtained by reducing an area displaying a black color and expanding an area displaying a white color in the second image, and, as shown in FIG. 8, the width w1 of the left vertical line of "H" in the first corrected image is smaller than the width w0 of the left vertical line of "H" in the second image.

Figure 9:
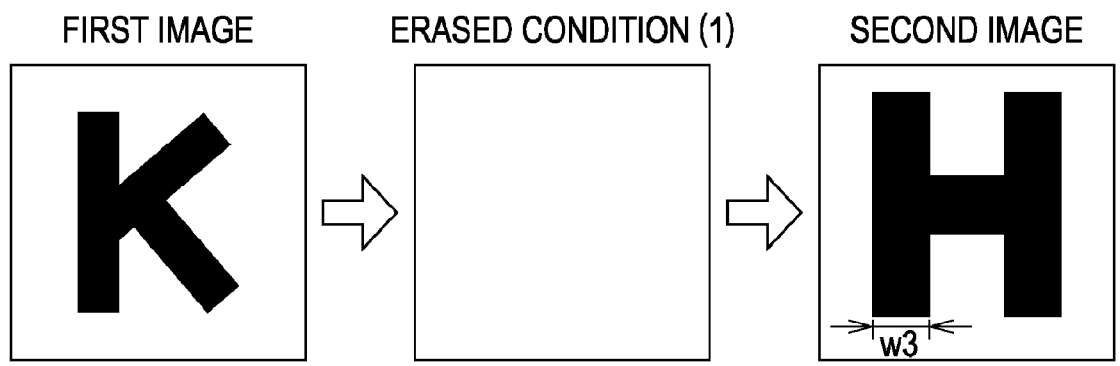
FIG. 9 is a first process drawing depicting in a step-by-step manner an image rewriting process in a comparative example of a driving method according to an embodiment of the invention.

FIG. 9 is a first process drawing depicting in a step-by-step manner a rewriting process in a comparative example of a driving method according to an embodiment of the invention.

In FIG. 9, assuming that the rewriting is performed not by using the foregoing first corrected image data, but using image data associated with the second image as it is, an image displayed on the display section 3 subsequent to the rewriting results in expanding of the area displaying a black color. That is, the width w3 of the left vertical line of "H" in the image displayed on the display section 3 subsequent to the rewriting is larger than the width w0 of the left vertical line of "H" which is supposed to be displayed in the second image.

Figure 10:
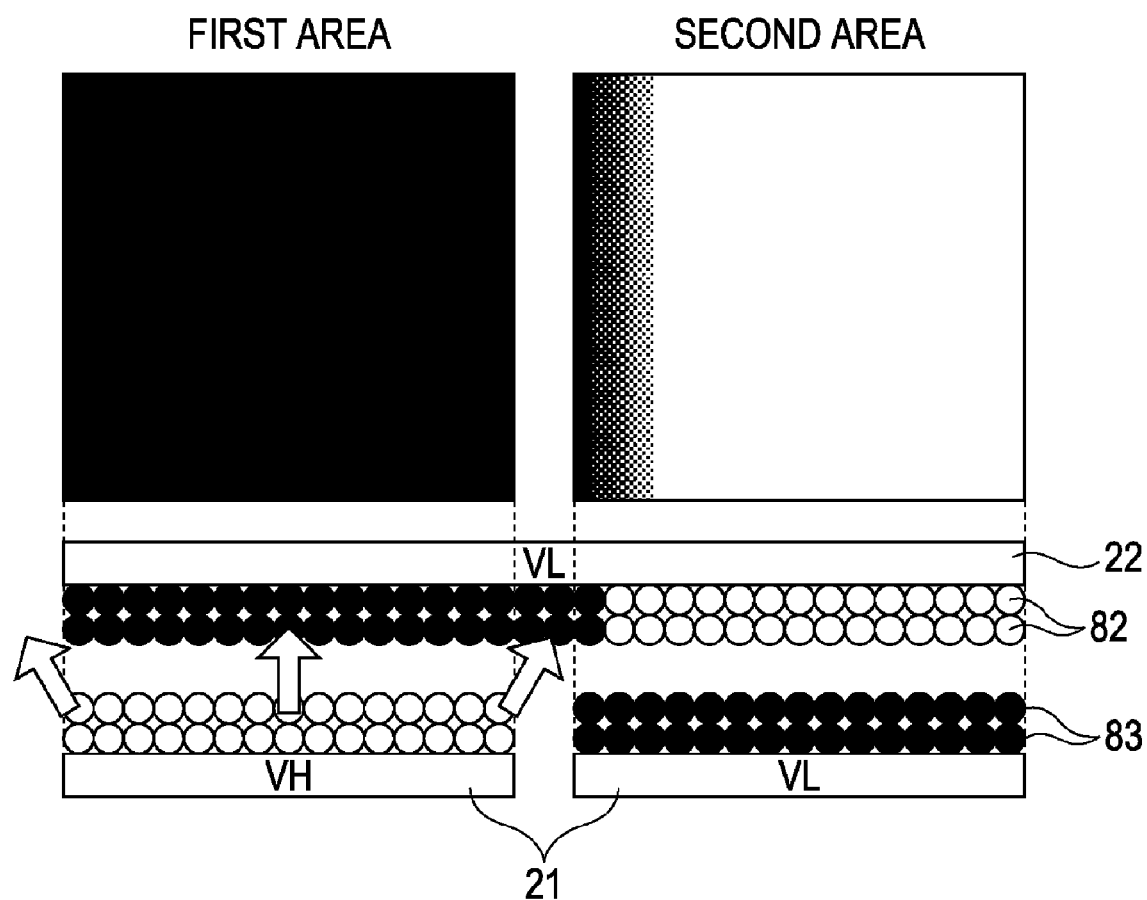
FIG. 10 is a first conceptual diagram depicting deformation of an image resulting from spreading of an electric field.

FIG. 10 is a first conceptual diagram depicting deformation of an image resulting from spreading of an electric field.

In FIG. 10, in the case where the second image is written into the display section 3 in the erased condition (1), as described above, the low level voltage VL is supplied to the common electrode 22. Further, the high level voltage VH is supplied to the pixel electrode 21 in the area targeted for displaying a black color (i.e., in the first area in FIG. 10), whereas the low level voltage VL is supplied to the pixel electrode 21 in the area targeted for displaying a white color, as with the common electrode 22. In this case, since a voltage difference occurs between the common electrode 22 and the pixel electrode 21 in the first area, the black color particles 83 are attracted to the common electrode 22 and the white color particles 82 are attracted to the pixel electrode 21. On the other hand, since a voltage difference does not occur between the common electrode 22 and the pixel electrode 21 in the second area, a condition in which the white color particles 82 have been attracted to the common electrode 22 and the black color particles 83 have been attracted to the pixel electrode 21 is retained.

Under this condition, in particular, an electric field resulting from occurrence of the voltage difference between the common electrode 22 and the pixel electrode 21 spreads to affect surrounding areas, as indicated by arrows in FIG. 10. For this reason, in portions of the second area adjacent to the first area, the black color particles 83 are attracted to the common electrode 22. Accordingly, even in the second area where the white color is supposed to be displayed, the black color is partially displayed. Therefore, as shown in FIG. 9, an image displayed after the rewriting results in expanding of the area displaying the black color.

Let us return to FIG. 8, and according to the driving method in the embodiment of the invention, since the rewriting of an image is performed on the basis of the first corrected image data for reducing the area displaying a black color, it is possible to prevent deformation of the image. The first corrected image data can be obtained, for example, by determining the width w1 of "H" in the first corrected image on the basis of two kinds of ratios associated with the deformation due to the spread of the electric field, one being an expansion ratio associated with the area displaying a black color, the other one being a reduction ratio associated with the area displaying a white color, which are obtained by measuring in advance the width w3 of "H" in the image displayed in the case described above with reference to FIG. 9, where the correction is not made. Accordingly, the width of the left vertical line of "H" in the rewritten image leads to a value the same as or fairly close to the width w0 of "H" to be displayed.

Figure 11:
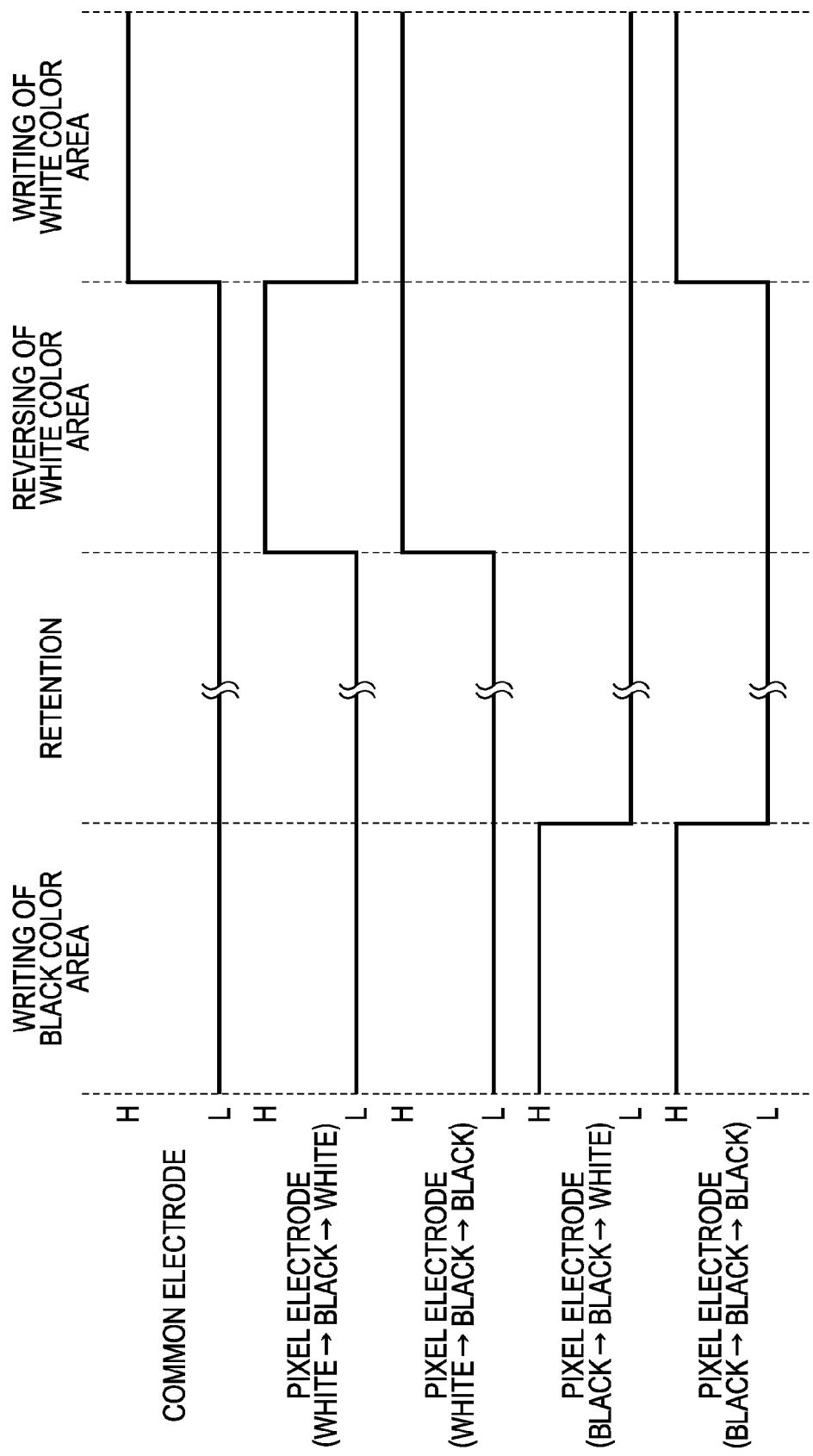
FIG. 11 is a second timing chart depicting each level of voltages supplied to a common electrode and a pixel electrode for each process in a driving method according to an embodiment of the invention.

FIG. 11 is a second timing chart depicting each level of voltages supplied to a common electrode and a pixel electrode for each process in a driving method according to an embodiment of the invention. Additionally, the following description will be made by way of example in the case shown FIG. 6, where the first image is rewritten into the second image via a solid black color image (i.e., via the erased condition (2)).

In FIGS. 6 and 11, for example, in the case where a solid white color image is displayed on the display section 3, the first image is displayed by allowing only the pixels 20 targeted for displaying a black color in the first image (i.e., the pixels 20 in the surrounding area of the alphabet letter "K") to rewrite their own display color into a black color. More specifically, as shown in FIG. 11, the low level voltage VL is supplied to the common electrode 22 as the common voltage Vcom by the common voltage supplying circuit 220 (refer to FIG. 1). Further, the high level voltage VH is supplied to the pixel electrodes 21 of the pixels 20 which are allowed to rewrite their display color from a white color to a black color (i.e., the pixels 20 targeted for displaying a black color in the first image) by the data line driving circuit 70. As a result of this, in each of the pixels 20 which are allowed to rewrite their display color from the white color to the black color, a voltage difference occurs between the common electrode 22 and the pixel electrode 21, so that the electrophoretic elements 80 of the pixel 20 are driven so as to display the black color. On the other hand, the low level voltage VL is supplied to the pixels 20 targeted for retaining a white color (i.e., the pixels 20 targeted for displaying a white color in the first image), so that a voltage difference does not occur between the common electrode 22 and the pixel electrode 21. Thus, the pixels 20 are not rewritten and continue to display the white color.

The first image is retained for a certain period of time, and then, is rewritten into the second image. In addition, during the retention period of time, the low level voltage VL is supplied to both the common electrode 22 and the pixel electrode 21. Thus, a voltage difference does not occur between the common electrode 22 and the pixel electrode 21.

When the rewriting of the image is performed, firstly, only the pixels 20 displaying a white color (i.e., the pixels 20 in the area surrounding the alphabet letter "K") are rewritten so as to display a black color. As a result of this, a solid black color image is displayed, as shown in the erased condition (2) of FIG. 6. More specifically, as shown in FIG. 11, the low level voltage VL is supplied to the common electrode 22 as the common voltage Vcom by the common voltage supplying circuit 220. Further, the high level voltage VH is supplied to the pixel electrodes 21 of the pixels 20 which are allowed to rewrite their own display color from a white color to a black color (i.e., the pixels 20, displaying a white color in the first image, being targeted for displaying a black color in the erased condition (2)) by the data line driving circuit 70. As a result of this, in the pixels 20 which are allowed to rewrite their own display color from the white color to the black color, a voltage difference occurs between the common electrode 22 and the pixel electrode 21, so that the electrophoretic elements 80 of the pixels 20 are driven so as to display the black color. On the other hand, the low level voltage VL is supplied to the pixel electrodes 21 of the pixels 20 targeted for retaining a black color (i.e., the pixels 20 displaying a black color in the first image, being targeted for continuously displaying the black color even in the erased condition (2)), so that a voltage difference does not occur between the common electrode 22 and the pixel electrode 21. Thus, the pixels 20 continue to display the black color.

Once the display section 3 is under the erased condition (2), only the pixels 20 targeted for displaying a white color in the second image (i.e., the pixels 20 in the area surrounding the alphabet letter "H") are rewritten so as to display the white color. More specifically, as shown in FIG. 11, the high level voltage VH is supplied to the common electrode 22 as the common voltage Vcom by the common voltage supplying circuit 220. Further, the low level voltage VL is supplied to the pixel electrodes 21 of the pixels 20 which are allowed to rewrite their own display color from a black color to a white color (i.e., the pixels 20 targeted for displaying a white color in the second image) by the data line driving circuit 70. As a result of this, in the pixels 20 which are allowed to rewrite their own display color from the black color to the white color, a voltage difference occurs between the common electrode 22 and the pixel electrode 21, so that the electrophoretic element 80 of the pixels 20 is driven so as to display the white color. On the other hand, the high level voltage VH is supplied to the pixel electrodes 21 of the pixels 20 targeted for retaining a black color (i.e., the pixels 20 targeted for displaying a black color in the second image), so that a voltage difference does not occur between the common electrode 22 and the pixel electrode 21. Thus, the pixels 20 continue to display the black color.

Figure 12:
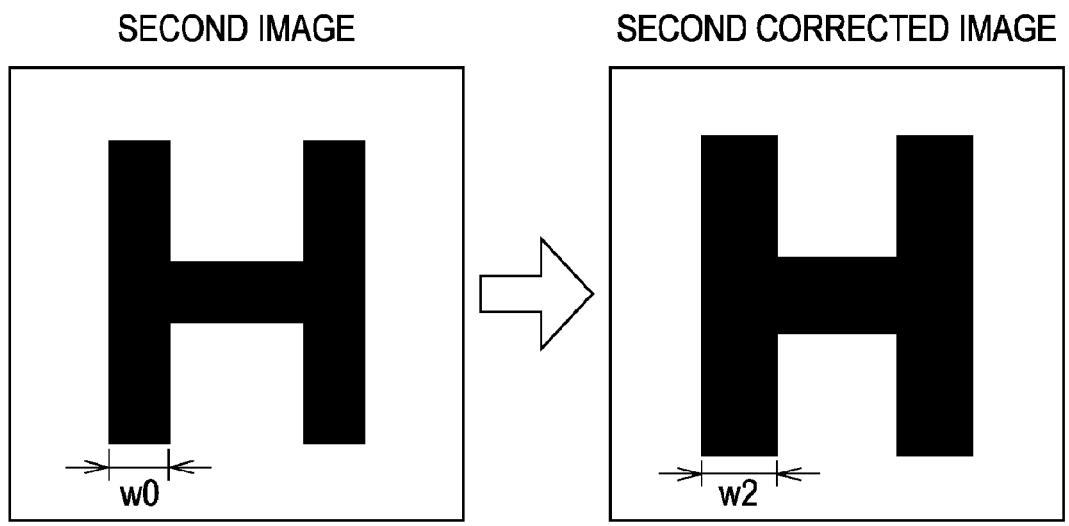
FIG. 12 is a plan view depicting a second image and a second corrected image obtained by correcting the second image.

FIG. 12 is a plan view depicting a second image and a second corrected image obtained by correcting the second image.

In FIG. 12, image data to be written into the display section 3 under the foregoing erased condition (2) is second corrected image data for generating a second corrected image, which is obtained by correcting image data associated with the second image. The second corrected image is an image obtained by reducing an area displaying a white color and expanding an area displaying a black color in the second image, and the width w2 of the left vertical line of "H" in the second corrected image is larger than the width w0 of the left vertical line of "H" in the second image.

Figure 13:
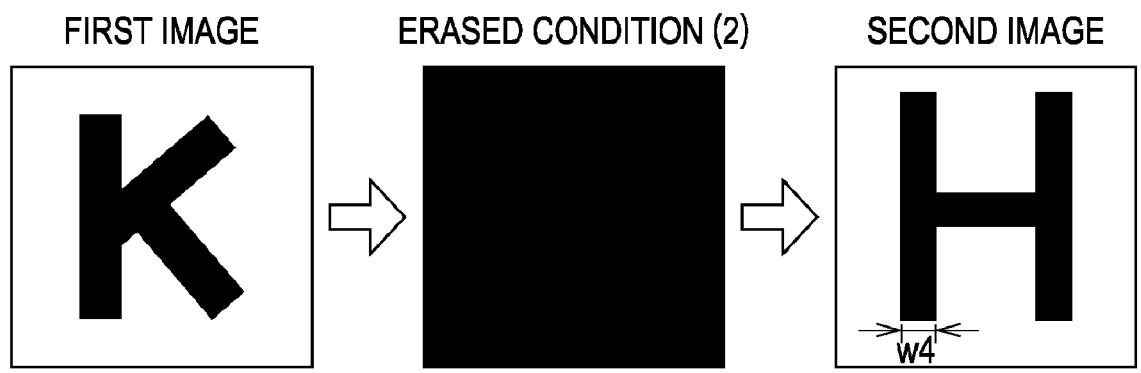
FIG. 13 is a second process drawing depicting in a step-by-step manner an image rewriting process in a comparative example of a driving method according to an embodiment of the invention.

FIG. 13 is a second process drawing depicting in a step-by-step manner a rewriting process in a comparative example of the driving method according to the embodiment of the invention.

In FIG. 13, assuming that the rewriting is performed not by using the foregoing second corrected image data, but using image data associated with the second image as it is, an image displayed on the display section 3 subsequent to the rewriting results in expanding of the area displaying a white color. That is, the width w4 of the left vertical line of "H" in the image displayed on the display section 3 subsequent to the rewriting is smaller than the width w0 of the left vertical line of "H" in the second image.

Figure 14:
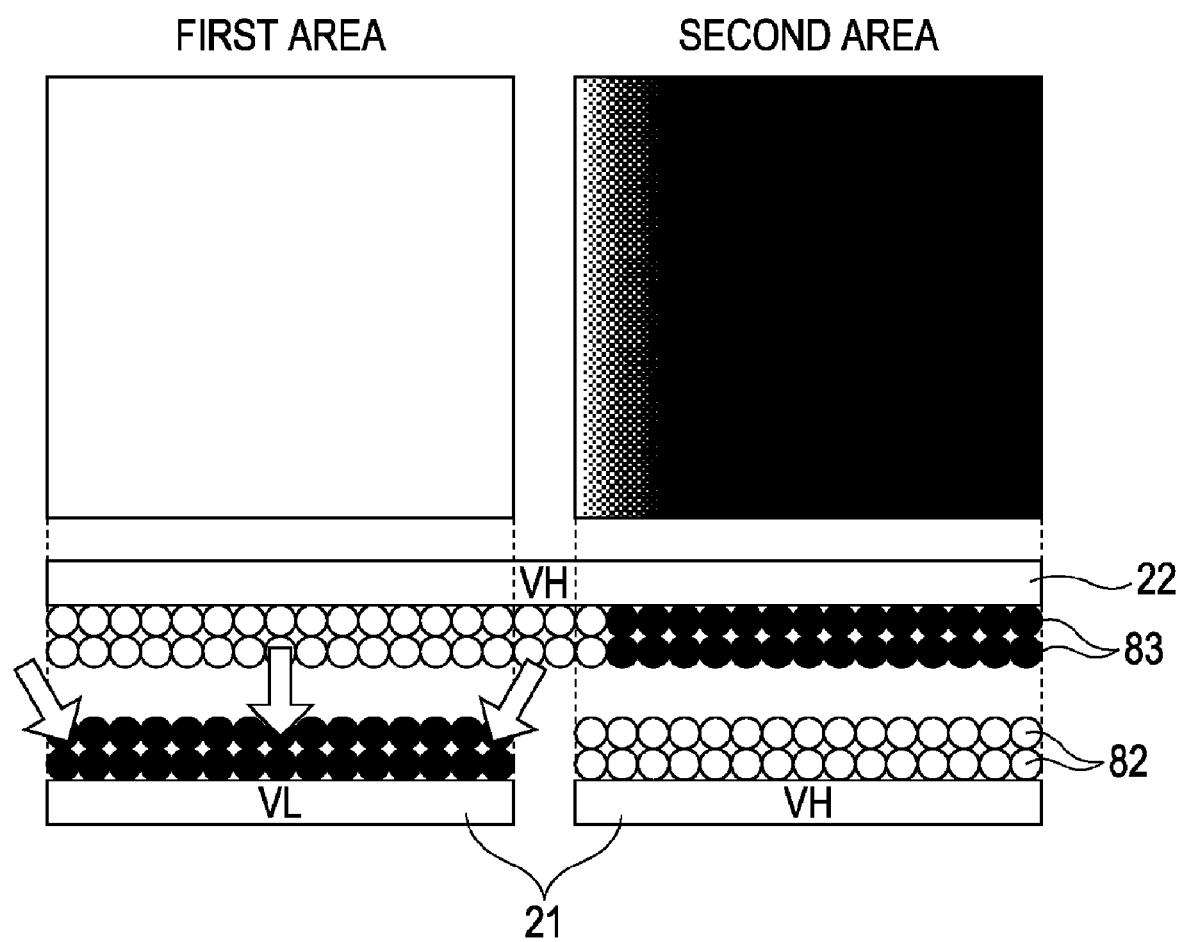
FIG. 14 is a second conceptual diagram depicting deformation of an image resulting from spreading of an electric field.

FIG. 14 is a second conceptual diagram depicting deformation of an image resulting from spreading of an electric field.

In FIG. 14, in the case where the second image is written into the display section 3 in the erased condition (2), as described above, the high level voltage VH is supplied to the common electrode 22. Further, the low level voltage VL is supplied to the pixel electrode 21 in the area targeted for displaying a white color (i.e., in the first area in FIG. 14), whereas the high level voltage VH is supplied to the pixel electrode 21 in the area targeted for displaying a black color, as with the common electrode 22. In this case, since a voltage difference occurs between the common electrode 22 and the pixel electrode 21 in the first area, the white color particles 82 are attracted to the common electrode 22 and the black color particles 83 are attracted to the pixel electrode 21. On the other hand, since a voltage difference does not occur between the common electrode 22 and the pixel electrode 21 in the second area, a condition in which the black color particles 83 have been attracted to the common electrode 22 and the white color particles 82 have been attracted to the pixel electrode 21 is retained.

Under this condition, in particular, an electric field resulting from occurrence of the voltage difference between the common electrode 22 and the pixel electrode 21 affects surrounding areas, in the same manner as shown in FIG. 10. For this reason, in portions of the second area adjacent to the first area, the white color particles 82 are attracted to the common electrode 22. Accordingly, even in the second area where the black color is supposed to be displayed, the white color is partially displayed. Therefore, as shown in FIG. 13, an image displayed after the rewriting results in expanding of the area displaying the white color.

Let us return to FIG. 12, and according to the driving method in the embodiment of the invention, since the rewriting of an image is performed on the basis of the second corrected image data for reducing the area displaying a white color, it is possible to prevent deformation of the image. The second corrected image data can be obtained, for example, by determining the width w2 of "H" in the second corrected image on the basis of two kinds of ratios associated with the deformation due to the spread of the electric field, one being an expansion ratio associated with the area displaying a white color, the other one being a reduction ratio associated with the area displaying a black color, which are obtained by measuring in advance the width w4 of "H" in the image displayed in the case described with reference to FIG. 13, where the correction is not made. Accordingly, the width of the left vertical line of "H" in the rewritten image leads to a value the same as or fairly close to the width w0 of "H" to be displayed.

As described above, when an image is partially rewritten even via the erased condition (1) (refer to FIG. 5) or via the erased condition (2) (refer to FIG. 6), the rewritten image is likely to be deformed due to the spread of the electric field. By performing the driving method according to the embodiment of the invention, it is possible to properly display an image to be displayed by using corrected image data obtained by predicting the deformation of the image, as described above.

Additionally, the first corrected image data and the second corrected image data, as described above with reference to FIG. 8 and FIG. 12, respectively, are typically obtained in advance for each of images to be displayed by the electrophoretic display apparatus, and further, are stored, for example, in a memory device, such as a RAM device, of the controller 10 (refer to FIG. 1). The controller 10 selects either of the first corrected image data or the second corrected image data, which have been stored in the memory device, depending on whether the rewriting of an image is performed via the erased condition (1) or via the erased condition (2), and then, performs control so as to rewrite the image by using the selected corrected image data.

Next, electronic devices to which the electrophoretic display apparatus is applied will be described with reference to FIGS. 15 and 16. An electronic paper and an electronic notebook will be hereinafter described as examples in which the electrophoretic display apparatus is applied to the electronic devices.

Figure 15:
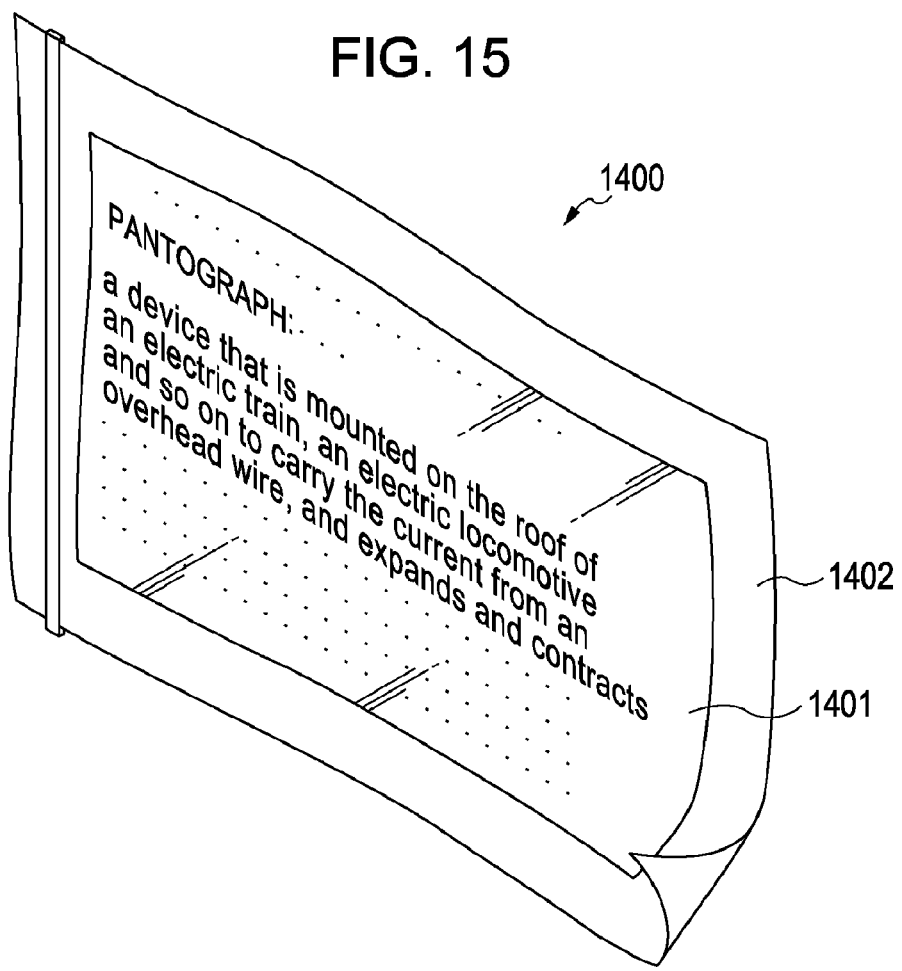
FIG. 15 is a perspective view depicting the structure of an electronic paper as an example of an electronic device to which an electrophoretic display apparatus according to an embodiment of the presentation is applied.

FIG. 15 is a perspective view depicting the structure of an electronic paper.

As shown in FIG. 15, an electronic paper 1400 includes the electrophoretic display apparatus according to the foregoing embodiment as a display section 1401. The electronic paper 1400 has a flexibility and includes a body 1402 composed of rewritable sheets each having a texture and a softness the same as those of a normal paper.

Figure 16:
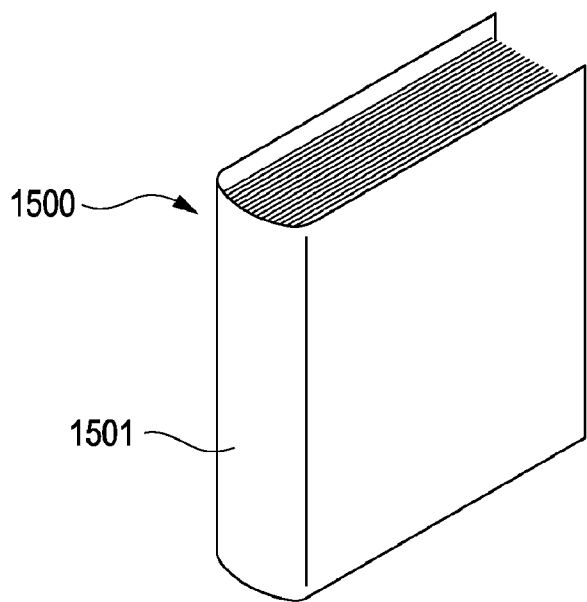
FIG. 16 is a perspective view depicting the structure of an electronic notebook as an example of an electronic device to which an electrophoretic display apparatus according to an embodiment of the presentation is applied.

FIG. 16 is a perspective view depicting the structure of an electronic notebook.

As shown in FIG. 16, the electronic notebook 1500 is a notebook in which a plurality of the electronic papers 1400 are bundled, and further, bound by a cover 1501. The cover 1501 includes, for example, a display-data inputting means (which is omitted in FIG. 16) for inputting display data sent from external apparatuses. By using this display-data inputting means, it is possible to change or update the display content in accordance with the inputted display-data under the condition where the electronic papers remain bundled.

The foregoing electronic paper 1400 and the electronic notebook 1500 include the electrophoretic display apparatus, and therefore, can reduce low power consumption, and further, can display images of high quality.

In addition, besides theses electronic devices, it is possible to apply the electrophoretic display apparatus according to the embodiment of the invention to display sections of the electronic devices, such as watches, mobile phones, mobile audio devices.

The invention is not limited to the foregoing exemplary embodiments. Various changes and modifications conceivable from the claims and the entire patent description of the invention can be made within the scope of the invention or without departing from the spirit of the invention. Any electrophoretic display apparatus, any driving method for driving the electrophoretic display apparatus and any electronic device having the electrophoretic display apparatus which include such a change or a modification are also included in the technical scope of the invention.

The entire disclosure of Japanese Patent Application No. 2008-071309, filed Mar. 19, 2008 is expressly incorporated by reference herein.

What is claimed is:

1. A driving method for driving an electrophoretic display apparatus, the electrophoretic display apparatus including:
   a display section including a plurality of pixels, each of the plurality of pixels including:
      a pixel electrode and a common electrode opposing each other; and
      an electrophoretic element interposed between the pixel electrode and a common electrode, the electrophoretic element including electrophoretic particles, the driving method comprising:

erasing a first image displayed on the display section, during a process of rewriting the first image into a second image, by:

supplying the common electrode with a common voltage, supplying the pixel electrodes of pixels among the plurality of pixels which are displaying one gradation out of a first gradation and a second gradation with a voltage corresponding to the other gradation out of the first gradation and the second gradation, the first gradation being different from the second gradation, and supplying the pixel electrodes of pixels among the plurality of pixels which are displaying the other gradation with a voltage of the same level as the common voltage; and displaying the second image on the display section, during the process of rewriting the first image into the second image, by:

supplying the common electrode with the common voltage, supplying the pixel electrodes of pixels among the plurality of pixels which are targeted for displaying the one gradation in accordance with corrected image data with a voltage corresponding to the one gradation, and supplying the pixel electrodes of pixels among the plurality of pixels which are targeted for displaying the other gradation in accordance with the corrected image data with a voltage of the same level as the common voltage, wherein the corrected image data is image data obtained by correcting image data associated with the second image so as to:

reduce an area targeted for displaying the one gradation in comparison with an area of the second image displaying the one gradation, and expand another area targeted for displaying the other gradation in comparison with another area of the second image displaying the other gradation.

2. The driving method for driving an electrophoretic display apparatus according to claim 1, wherein the displaying includes selecting of one of first corrected image data and second corrected image data as the corrected image data, wherein the first corrected image data is image data obtained by correcting the image data associated with the second image so as to reduce an area targeted for displaying the first gradation in comparison with an area of the second image displaying the first gradation and expand another area targeted for displaying the second gradation in comparison with another area of the second image displaying the second gradation, and the second corrected image data is image data obtained by correcting the image data associated with the second image so as to reduce an area targeted for displaying the second gradation in comparison with an area of the second image displaying the second gradation and expand another area targeted for displaying the first gradation in comparison with another area of the second image displaying the first gradation, and wherein, during the selecting, in the case where the one gradation in the erasing is the first gradation, the first corrected image data is selected as the corrected image data, and in the case where the one gradation in the erasing is the second gradation, the second corrected image data is selected as the corrected image data.

3. An electrophoretic display apparatus comprising the driving method for driving an electrophoretic display apparatus as set forth in claim 1.

4. An electronic device comprising the electrophoretic display apparatus as set forth in claim 3.

* * * * *